INVENTORS
ABRAHAM FRANCK
GEORGE F. MARETTE
BERC I. PARSEGYAN
BY Herbert F. Sperberger (signature)
ATTORNEY

INVENTORS
ABRAHAM FRANCK
GEORGE F. MARETTE
BERC I. PARSEGYAN
BY
ATTORNEY

INVENTORS
ABRAHAM FRANCK
GEORGE F. MARETTE
BERC I. PARSEGYAN
BY Herbert F. Jannmeyer
ATTORNEY ARITHMETIC SYSTEM UTILIZING FERROMAGNETIC ELEMENTS HAVING SINGLE DOMAIN PROPERTIES Filed Oct. 10, 1960

INVENTORS
ABRAHAM FRANCK
GEORGE F. MARETTE
BERC I. PARSEGYAN
BY Hubert [signature]
ATTORNEY

184

INVENTORS
ABRAHAM FRANCK
GEORGE F. MARETTE
BERC I. PARSEGYAN
BY Herbert F. Somermeyer
ATTORNEY INVENTORS
ABRAHAM FRANCK
GEORGE F. MARETTE
BERC I. PARSEGYAN
BY Herbert F. Sonnemeyer
ATTORNEY

United States Patent Office 3,192,368
Patented June 29, 1965

3,192,368

ARITHMETIC SYSTEM UTILIZING FERROMAGNETIC ELEMENTS HAVING SINGLE DOMAIN PROPERTIES

Abraham Franck and George F. Marette, Richfield, and Berc I. Parsegyan, St. Paul, Minn., assignors to Sperry Rand Corporation, New York, N.Y., a corporation of Delaware Filed Oct. 10, 1960, Ser. No. 61,534
16 Claims. (Cl. 235—175)

The present invention relates to mechanical arithmetic systems and more specifically to a one's complement additive system without ambiguous zero indications consisting of simplified function table types of arithmetic devices utilizing thin single domain ferromagnetic elements as saturable transformers and as signal coincidence magnetic gates by controlling the rotation of the elements' residual magnetizations.

In electronic computing machines or data processors there has been an increasing emphasis on size reduction and decreased power requirements together with increased speeds. The present invention provides a compact arithmetic accumulator consisting of interconnected uniaxial anisotropic ferromagnetic elements such as disclosed by Sidney Rubens in Patent 2,900,282, issued on August 18, 1959. These elements have uniaxial anisotropy in that residual magnetization lies in one of two directions along a preferred or easy magnetization axis. Transverse to the easy axis there is exhibited a hysteresis characteristic with substantially zero loss whenever the elements' remanence or residual magnetization lies *entirely* along the easy axis and there is nor has there been applied any magnetic field along the hard axis of sufficient strength to cause remanence along that axis. The easy axis remanence may be rotated away from the axis by a transverse field and returned to the easy axis upon removal of the transverse field. Under this set of circumstances the element is said to behave like a single magnetic domain and to possess single domain remanence.

Because of the above described uniaxial anisotropy these elements are usable as saturable transformer cores along their hard axes. Further, during rotational remanence reversal the direction of magnetization causes a flux change along the hard axis which causes an induced voltage in the winding, the phase of which is indicative of the rotation direction or sense irrespective of the remanence directions.

Accordingly it is an object of the present invention to provide an arithmetic system utilizing ferromagnetic elements having single domain properties.

It is a further object of the present invention to provide an arithmetic system having a parallel type accumulator and in which the arithmetic processes are performed by ferromagnetic single domain element circuits in two sequential steps.

It is another object of the present invention to provide a one's complement binary notation arithmetic system having an accumulator of the additive type without an ambiguous zero indication.

It is still another object to provide method and apparatus for adding two signal indicated numbers together in a grouped signal process in which a one or zero carry signal is provided for each group individual sum signals.

The present invention performs addition of two binary numbers by a so-called group addition wherein the N-digit augend and addend are divided into M groups of K bits (binary digits) each. The sum and carry of each group is formed in a first step in a matrix or array of single domain ferromagnetic saturable transformers. The sum is completed in a second step by sensing group provided carries with indicated numeric group sums of higher ordinal groups in a matrix or rectangular array of ferromagnetic elements having their respective magnetizations rotationally disturbed. Simultaneously to the latter so-called carry step, the provided carries are effectively routed through a saturable transformer matrix acting as a lowest order digit input for each group sum, whenever a group provided carry is either transferred past the respective group sum to another group or can be fully satisfied within the group. Each group input is termed an intrinsic carry and is either a binary zero or one, an intrinsic carry occurring in the second step for each of the groups.

In a modification of the present invention the logical arrangement is such to permit the thin film ferromagnetic cores to be used in the "transformer mode," i.e., all windings associated with the respective elements are coupled only to the hard axis of magnetization. This modification is illustrated in FIGURES 7 and 8 of the drawing wherein the inputs to the sum accumulating register "A" is of the "set" and "clear" type rather than the "toggle" inputs used in the presently preferred embodiment. Only the intrinsic carry signals "toggle" the "A" register bistable circuits. Both illustrated embodiments use ferromagnetic thin film arrays to accomplish the arithmetic operations.

These and other more detailed and specific objects will be disclosed in the course of the following specification, reference being had to the accompanying drawing, in which—

Figures 1, 2, 3, 4:
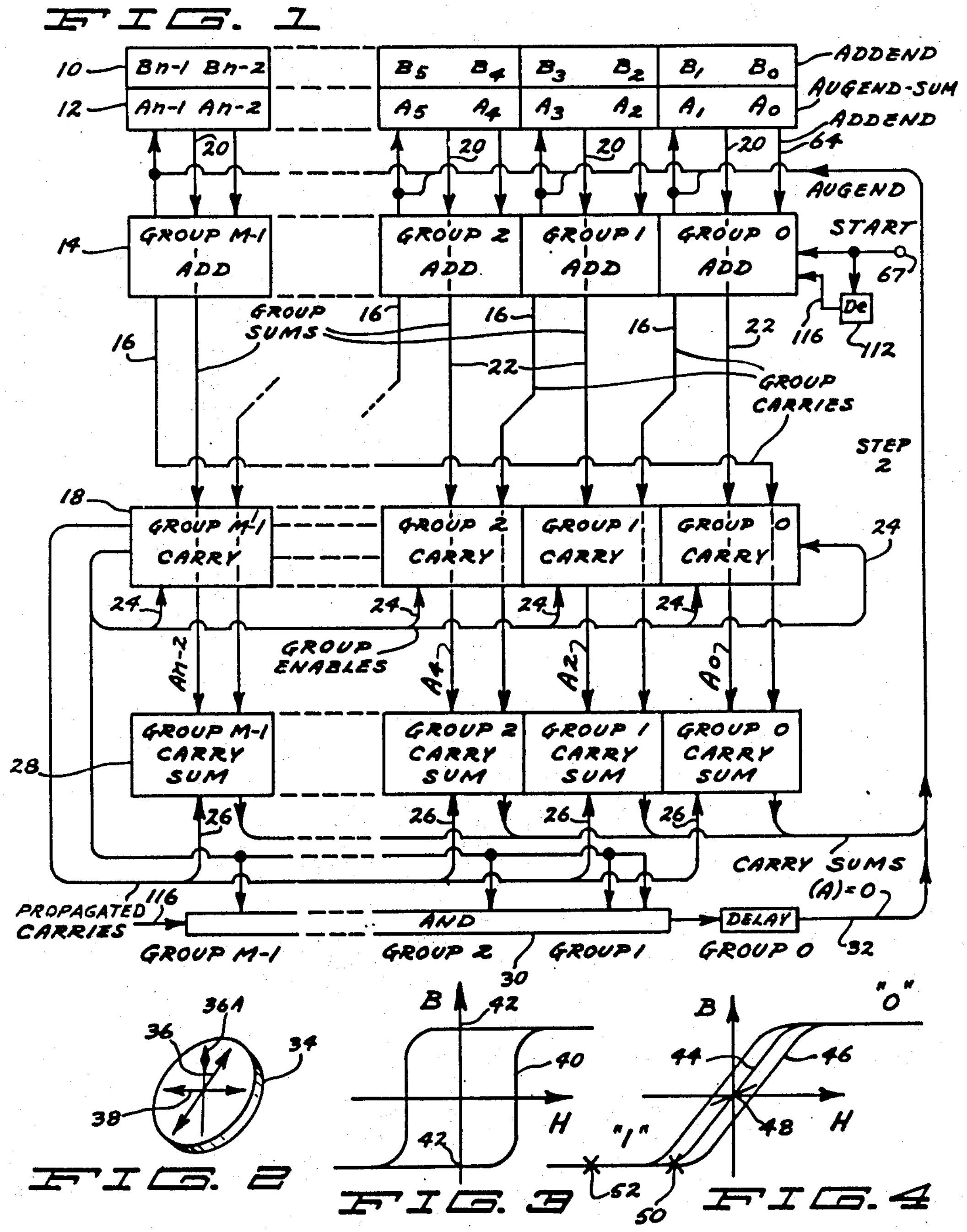
FIGURE 1 is a simplified block symbol signal flow diagram of the illustrated embodiment of the invention.
FIGURE 2 shows an enlarged disc shaped ultra-thin ferromagnetic element exhibiting uniaxial anisotropy.
FIGURE 3 shows an idealized hysteresis characteristic exhibited along the easy magnetization axis of the FIGURE 2 element.
FIGURE 4 shows an idealized hysteresis characteristic exhibited along the hard axis of magnetization of the FIGURE 2 element.
Figure 4A:
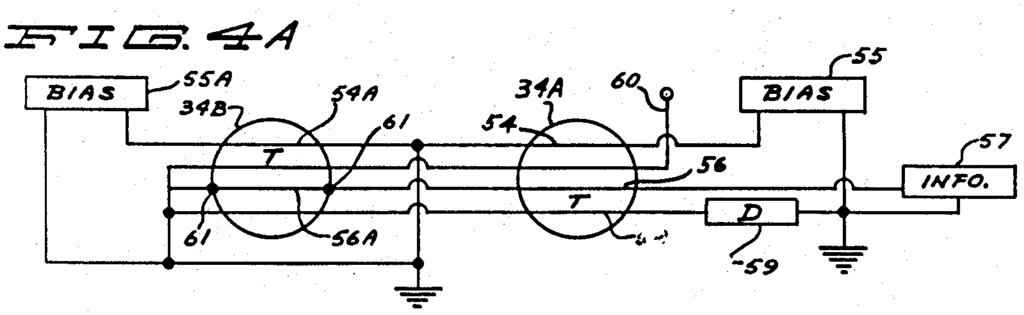

FIGURE 4A schematically shows the windings and magnetic bias circuits associated with the FIGURE 2 element as used in this invention.

Figure 5A:
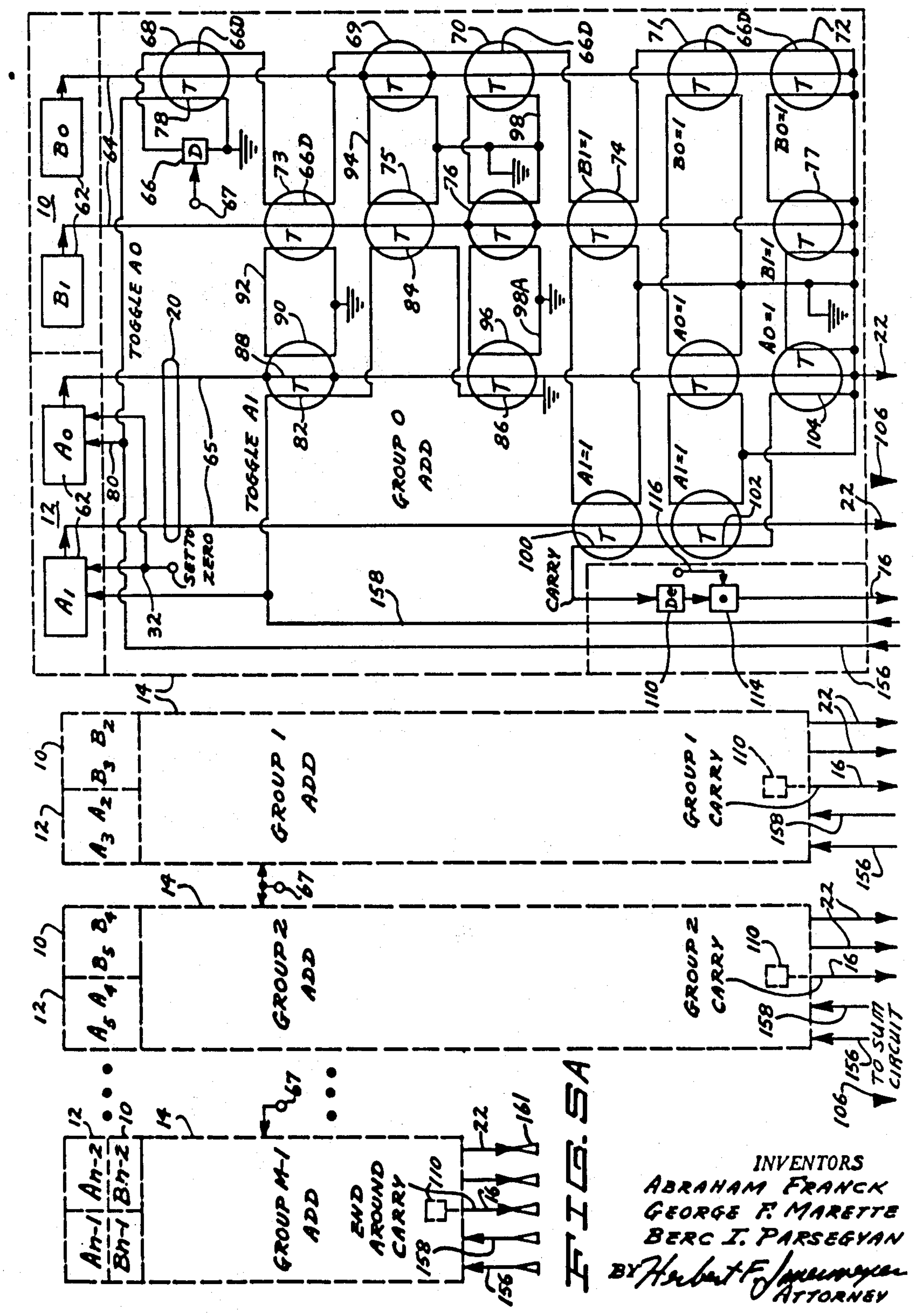
Figure 5B:
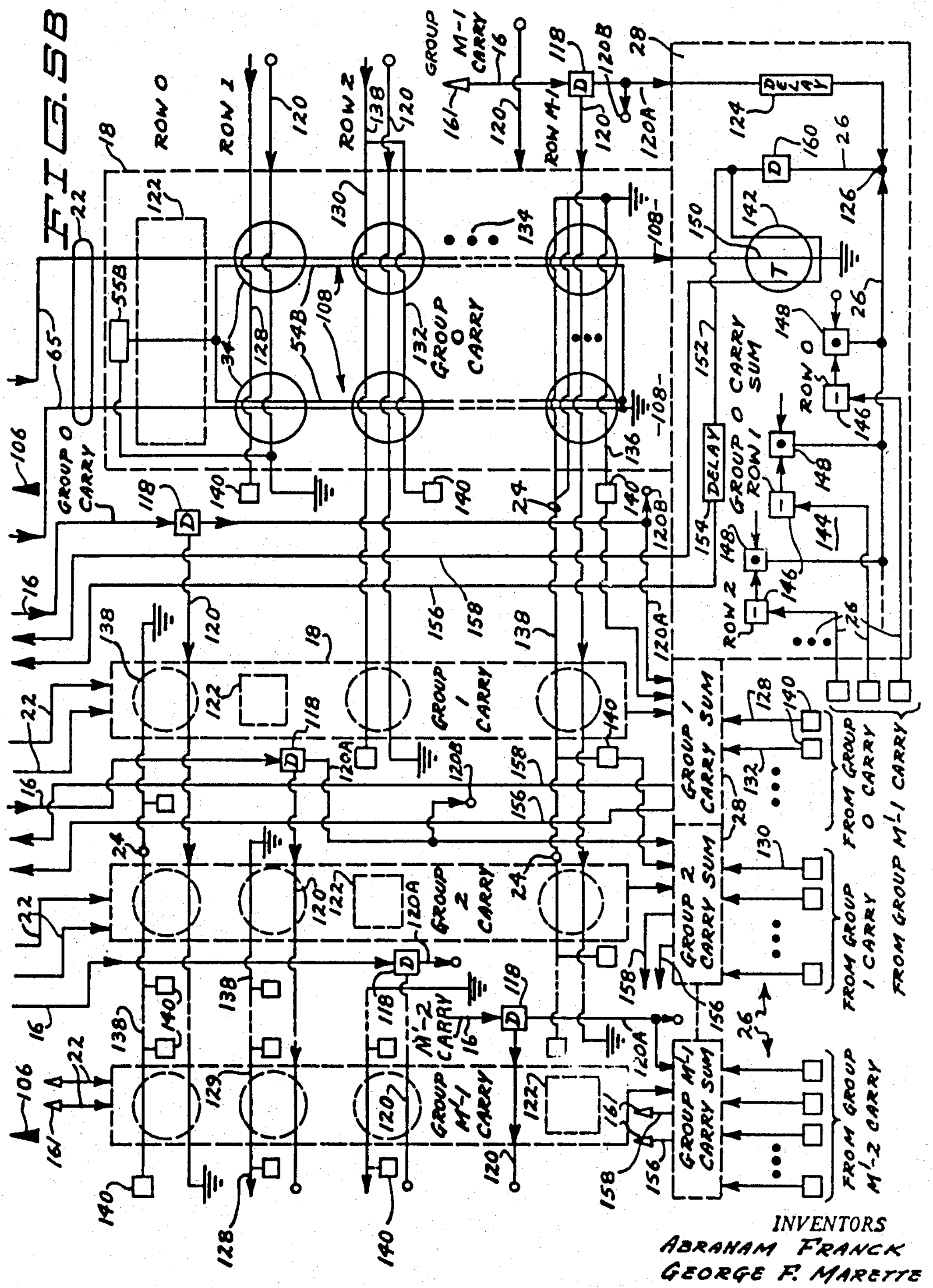

FIGURES 5A and 5B together form an abbreviated detailed schematic diagram of the FIGURE 1 illustration.

Figure 6:
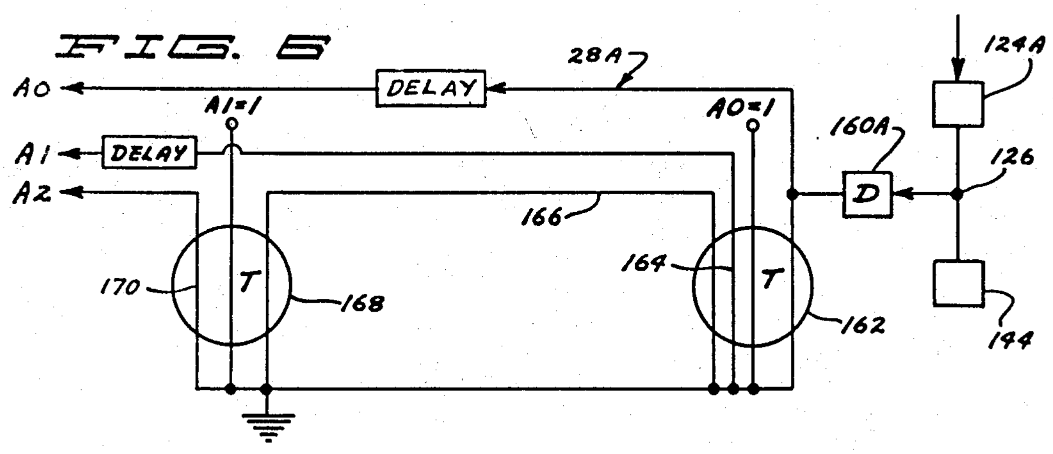

FIGURE 6 is a partial schematic diagram of carry sum circuiting for a three digit register group.

Figure 7:
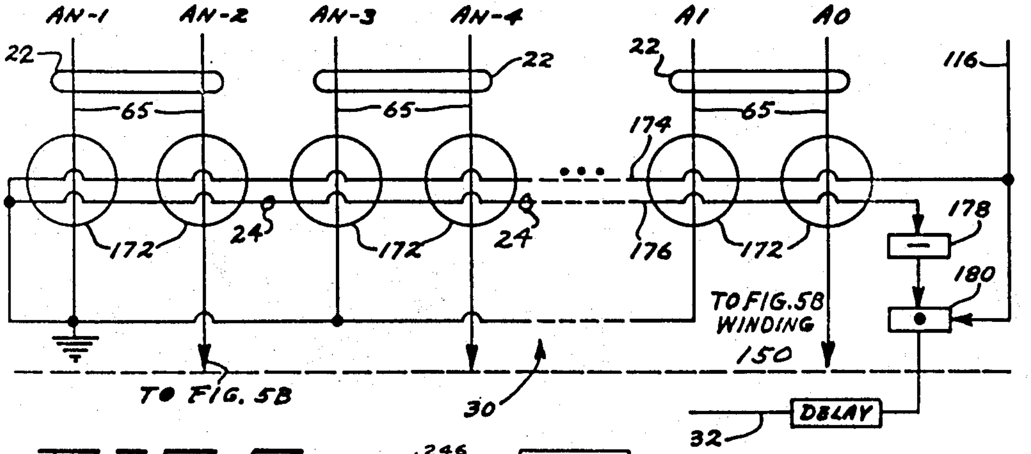

FIGURE 7 is a schematic diagram of an all "zero" detector for use with the illustrated "A" register.

Figure 8:
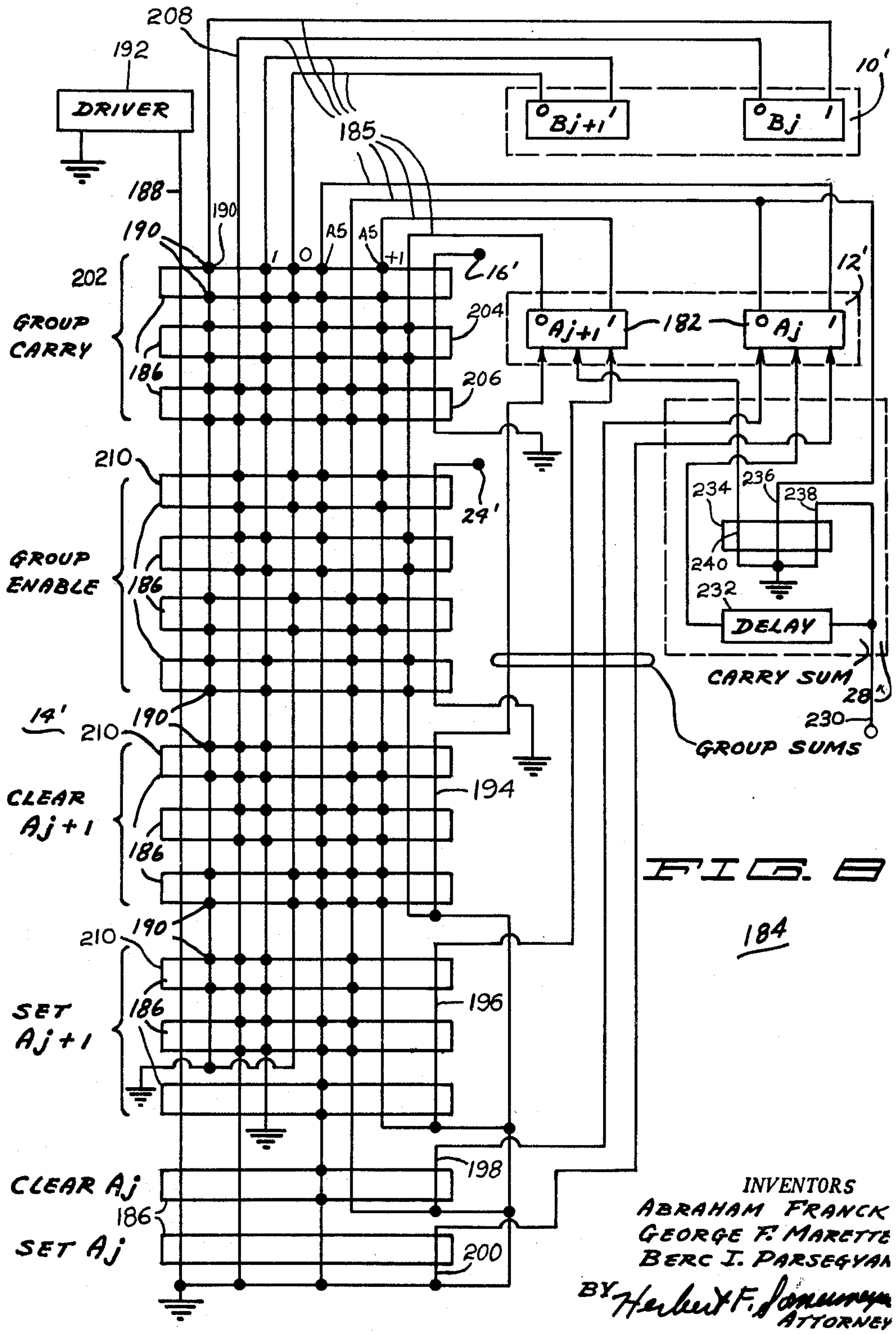

FIGURE 8 is a combined block and simplified schematic diagram of a modification of the present invention which permits the thin film elements as saturable transformers.

Figure 9:
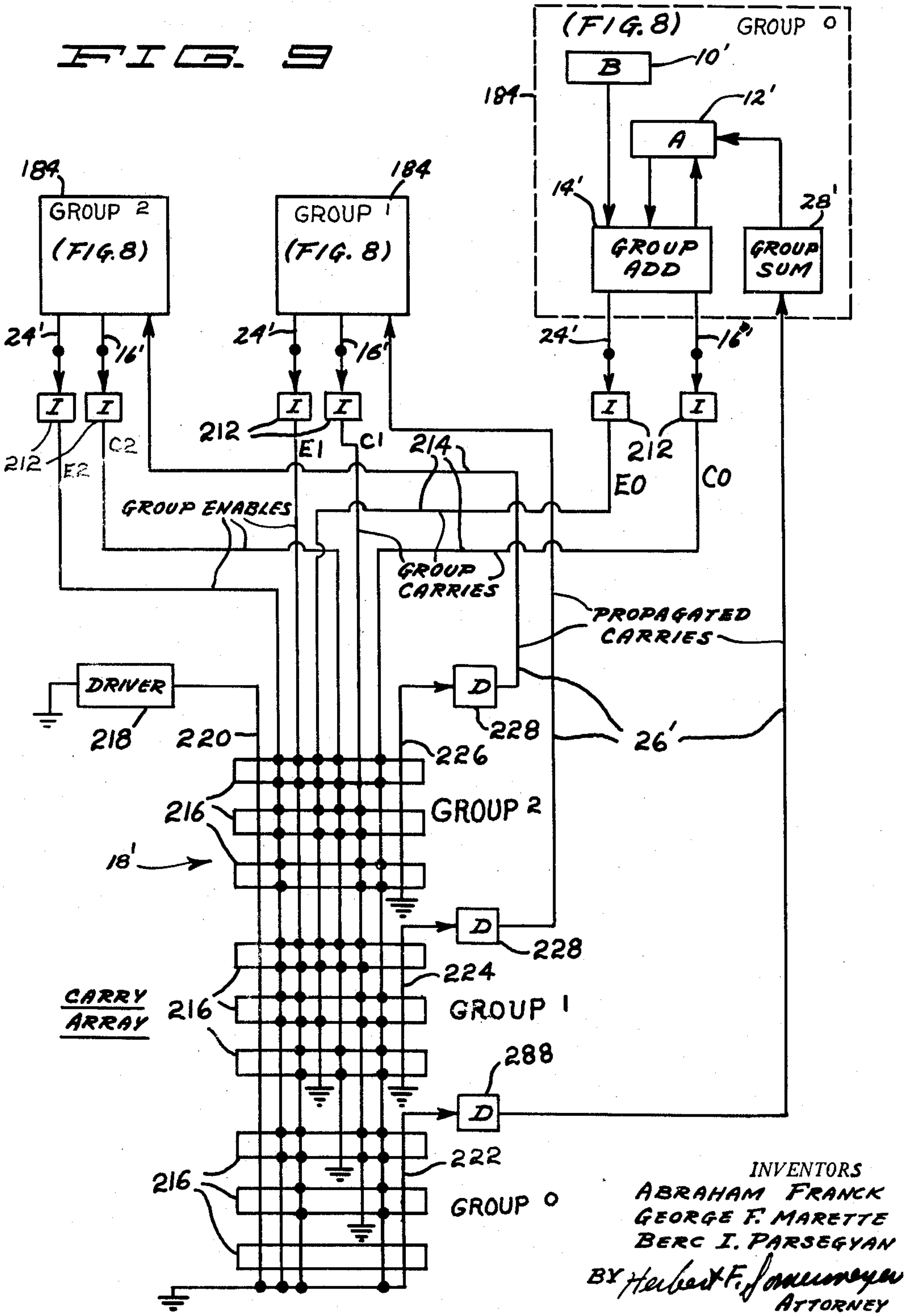

FIGURE 9 is a schematic diagram of an exemplary adder for use in the FIGURE 8 modification.

Figure 10:
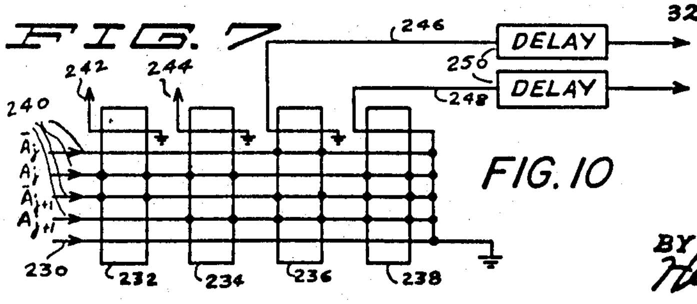

FIGURE 10 is a schematic diagram of a thin film saturable transformer array used to add the intrinsic carries to the "A" register without toggling the individual register stages.

Since the present invention is rather complex the specification is divided into several parts herein-below listed.

Principles of Operation, inter alia, describes the numeric basis for the illustrated embodiments.

System Description describes FIGURE 1.

The Ferromagnetic Elements describes how the Rubens' ferromagnetic discs are used in this invention.

Detailed Description describes the implementation of the FIGURE 1 embodiment with the magnetic discs as arranged in the following sections:

(1) Group Add Circuits 14
(2) Group Carry Circuits 18
(3) Group Sum Circuits 28
(4) AND Circuit 30.
(5) Modified System describes the FIGURES 7 and 8 illustrated embodiment.

PRINCIPLES OF OPERATION

Addition of two numbers in one's complement binary notation is provided by inserting the addend indicating signal in the "B-register" 10 and the augend indicating signals in the "A-register" 12. The sum of the two numbers resides in the register 12, causing destruction of the augend signals. As used herein the terms addend, augend, sum, carry and the register ordinal numbers are intended to refer to electrical signals of the digital type. A "1" is defined as a first predetermined voltage or current magnitude which is sufficient to perform hereinafter defined electrical operations. A "0" is defined as a signal which is incapable of performing such later defined electrical operations.

The operation of this invention is by a so-called group addition method based on the arithmetic principle that the sum of the individual parts of a number equals the sum of the wholes. In other words, when in two numbers $A2^2+B2^1+C2^0$ and $D2^2+E2^1+F2^0$, where the alphabetic letters indicate numeric integers $$(A+D)2^2+(B+E)2^1+(C+F)2^0=(A2^2+B2^1+C2^0)+(D2^2+E2^1+F2^0)$$

The left hand term represents in simplified form the mode of addition performed by the present invention.

The addition is performed in two distinct steps as outlined herein for four groups of two bits (binary digits) each.

Step 1: Form sums and carries in each group.

| | | | | |
|---|---|---|---|---|
| Group numbers | 3 | 2 | 1 | 0 |
| Augend | 01 | 10 | 11 | 10 |
| Addend | 00 | 11 | 00 | 11 |
| Group sums | 01 | 01 | 11 | 01 |
| Group carries | 0 | 1 | 0 | 1 |

At the end of step 1 the group sums appear in the A-register 12. Note the sums do not include the group carries.

Step 2: Determine which groups can satisfy the group carries and permit an all one's group sum to permit a carry to be propagated to the next higher order group with the highest order group sending its carry to the lowest order group, i.e. end around carry. Also, add the carries to the appropriate group sums. When a carry is propagated past a group by a group sum signal, add the carry to that group and to the next significant group as shown below.

| | | | | |
|---|---|---|---|---|
| Group number | 3 | 2 | 1 | 0 |
| Addend | 00 | 11 | 00 | 11 |
| Group sums | 01 | 01 | 11 | 01 |
| Group carries | 0 | 1 | 0 | 1 |
| Group enable | 0 | 0 | 1 | 0 |
| Sum | 10 | 10 | 00 | 01 |

A group carry is provided when the group sum exceeds the group modulus. In a two-bit group, the modulus is 4, or $2^k$ where $k$ is the number of bits in a group. A group sum passes a carry when the group sum is one less than the group modulus, $2^k$ and will terminate a carry when the group sum is smaller than the above amount. A carry traversing a group sum is called a propagated or high speed carry and the all "one's" sum is termed a group enable, i.e. it "enables" a carry to go by.

It should be noted that in any one group when a carry is produced, that same group cannot produce an all 1's group sum. The maximum number in either a group addend or augend is $2^k-1$ or all one's. The maximum group sum is:

$$(2^k-1)+(2^k-1)=2^{k+1}-2$$

Subtracting the carry, $2^k$, leaves $2^k-2$ which is less than $2^k-1$. Accordingly each group will receive no more than one carry. By definition, no carry is a "0" intrinsic carry while an actual numeric carry is a "1" intrinsic carry, one carry to be received by each group. Since such "carries" are only concerned with one group they are termed "intrinsic carries." Subsequent references to the intrinsic carries do not refer to actual numeric carries, rather to the "0" and "1" intrinsic carry signals.

It is understood that the described two-bit groups were selected for simplicity and clarity and that in a practical application of this invention the group would contain several bits. Further, while particularly adaptable to one's complement binary notation; no limitation thereto is intended.

SYSTEM DESCRIPTION

Referring now to FIGURE 1, a one's complement embodiment of the present invention is shown in block diagrammatic form, the circuitry in each block being illustrated in FIGURES 5A and 5B in an abbreviated schematic form. It is understood that each of the registers 10 and 12 groups are separate and distinct, the two registers being shown together to more easily explain the arithmetic system. The usual Eccles-Jordon bistable circuit may be used to construct each digit position of the registers 10 and 12, this being sufficiently well known to warrant no further discussion herein. Each register bistable circuit acts as a binary counter in that a signal input will toggle the circuit to its other state, i.e., a circuit having in a "zero" state is switched to the "one" state, and vice versa.

Initially the augend is inserted into the A register 12 and the addend is inserted in the B-register 10, both in one's complement binary notation of N digits. The binary one output of each register's digit positions, indicated by $A_0$, $A_1$, etc. and $B_0$, $B_1$, etc., respectively, for the registers 12 and 10, are provided simultaneously to the group add circuits 14. These circuits 14, as are the A and B registers, are divided into M identical groups, each of which determines the group sum and carry in what constitutes step 1 of the addition process. Each group add circuit performs the arithmetic functions of a two-bit adder as will be later fully described. The group sums formed by the respective circuits 14 are inserted into the A-register 12, destroying the augend. Alternately, if the augend is to be preserved in an arithmetic system, a separate register may be provided for holding or storing the group sums after step 1 and the arithmetic sum after the later described step 2. The formed group carries from the circuits 14 are transferred over the respective lines 16 to the next higher order group carry circuit. That is, the carry line 16 from the Group 0 add circuit 14 is connected to the Group 1, or next higher order carry circuit 18, etc.

It may be noted that the lines 20 each respectively indicate that two binary one signals are transferred from the registers 10 and 12 to the respective add circuits. Further each A-register "one" signal is connected over the respective lines 22 to the carry circuits 18 for use in determining the numeric value of the respective intrinsic carries. It is to be noted that the lines 20–22 carry the "one" augend signals during step 1 and the sum signals in step 2.

Step 2 of the addition process is best described in two parts, the intrinsic carry determination and the addition of the intrinsic carries to the step 1 formed group sums.

It is understood that both parts of step 2 occur substantially simultaneously.

The group carry circuits 18 consist of a ferromagnetic element matrix having $M^1$ groups as shown. The group sum signals on the lines 22 of all groups 0 through $M^1-1$ except the sum signals from the group add circuit originating a carry signal on a line 16 are compared with that carry signal. The resultant signals on the respective lines 24 indicate so-called group enable signals from the various carry circuit 18 groups. These signals "enable" the line 16 carry signal to be transferred to the next higher order group in a new and novel manner.

These group enable signals are combined in a later described manner to produce the intrinsic carries over the respective lines 26 to the carry sum circuits 28. The circuits 28 add the intrinsic carry respectively to the lowest order digit of each A-register 12 group and performs the carry addition to the higher order group digits. Note that this latter addition is entirely within each group and consists of merely adding a one or a zero to each group. A counter circuit may be used to perform this addition.

In this embodiment additive type circuit arrangements are used. When using the one's complement notation in an additive accumulator an ambiguous zero indication arises when the addend and augend corresponding digit positions contain unlike binary numbers. That is, for the addend digits equaling zero, the augend digits equal one, and vice versa. This produces all one's in all group sums formed in step 1, which numerically is a so-called negative zero; the usual zero being zero's in all digit positions.

All of the group enable signals are connected to the AND circuit 30 providing a signal on line 32 indicating that the numeric contents of the A-register 12 equals zero. The signal is provided to all the A-register digit positions for setting same to zero's, thereby eliminating the ambiguous zero indication. Accordingly the illustrated embodiment adds all positive and negative one's complement numbers without zero indication ambiguity. The carry initiate pulse on line 116 may be used to time the all zero detection with the line 32 signal being delayed such that the A-register is set to zero after all later described carry and group summing operations have been completed.

THE FERROMAGNETIC ELEMENTS

With particular reference to the FIGURES 2, 3 and 4 the ferromagnetic elements having uniaxial anisotropy are further explained. Each element 34 is preferably disc shaped as in FIGURE 2. It has the easy magnetization axis 36 and the hard magnetization axis 38 in the plane of the disc film. Because of the geometry of the disc, i.e. it is ultra thin, the magnetic properties perpendicular to the film plane are ignored. The elements 34 are prerably interconnected by the well known printed circuit windings and as schematically shown in FIGURES 5A and 5B.

The hysteresis characteristic 40 of FIGURE 3 preferably is exhibited along the easy axis 36 having the residual magnetization of a large proportion of the saturating flux, as at points 42. When all of the element's residual magnetization or remanence is along the easy axis the hysteresis characteristic 44 of FIGURE 4 is exhibited along the hard axis 38. Note that the loop represents substantially no loss. However, if a field is applied along the hard axis 38 of sufficient strength, part of the remanence will lie along that axis giving rise to the hysteresis characteristic 46 of greater loss. The substantially no-loss hysteresis characteristic loop 44 is believed caused by all the remanence lying along the easy axis 36 to impart single domain properties to the element. That is, so long as the remanence remains aligned entirely with the easy axis, the element's magnetization acts as a single magnetic vector or domain. It is preferred that the elements used in this invention are magnetized in this manner.

This invention uses the elements in two modes of operation. The first is termed a saturable transformer mode in which all windings are magnetically linked to the respective elements hard axes. In the absence of external fields the residual magnetization along the hard axis is at 48, i.e. zero. Each element is magnetically biased to a point 50 or a point 52, as by current flowing in a one turn printed circuit winding as now described.

The saturable transformer mode is best understood by referring to FIGURE 4A wherein a complementing and a non-complementing transformer are schematically illustrated. The disk 34A has a printed circuit bias winding 54 carrying a current from bias source 55 moving the magnetization to point 52 (FIGURE 4) well beyond the knee of the curve 44. The information signal winding 56 carries a current from the information signal source 57, such as the bistable elements in the A- and B-registers. By arbitrary definition the hereinbefore referred to "one" binary signal is a current magnitude capable of providing from a one turn printed circuit winding a magnetomotive force (M.M.F.) represented by the abscissa distance between the point 50 and 52. A "zero" signal is a substantially zero current. Accordingly a one signal in the winding 56 provides an M.M.F. opposing the bias M.M.F. by an oppositely flowing current to move the magnetization from the point 52 to point 50. The information is transferred through the element 34A by a so-called clock drive current impulse in the winding 58 from a source 59. The clock M.M.F. aids the information M.M.F. to momentarily drive the element 34A into its high permeability region and beyond the zero point 48. The resultant rapid flux change induces a substantial voltage in the sense winding 60. This non-complementing transformer arrangement is indicated in the other figures by a circle with a "T" therein. For clarity the bias winding 54 and bias source 55 are not shown, it being understood the letter T indicates same are present.

The complementing transformer, i.e. element providing a "one" signal output for a "zero" signal input, and vice versa, is schematically indicated as element 34B. A second bias source 55A provides one-half the source 55 current magnitude to the winding 54A to magnetically bias the element 34B to point 50 on the curve 44. The information signal winding 56A is disposed with respect to the bias winding 54A such that the two M.M.F.'s are additive for moving the magnetization to the point 52 whenever a "one" signal is provided thereto.

The letter T with the two dots 61 is intended to indicate the above described complementing transformer arrangement including the bias source 55A and the relation between the bias and information windings. With this arrangement the clock pulse winding 58 is oriented such that a current therein termed a "clock pulse" opposes both fluxes, from the windings 54A and 56A, in the element 34B. Accordingly with a "zero" current in the winding 56A, a "one" signal is provided to the winding 60 by the clock current pulse in winding 58, while a "zero" current (absence of electrical current) is provided for a "one" current in the winding 56A.

In single domain magnetized elements the flux changes are by the rotation of the flux vector toward and away from the easy axis. In this mode a single domain magnetization reduces the magnitude of a zero or so-called sneak signal so commonly associated with magnetic amplifiers and devices.

The second mode of operation comprises remanence or residual magnetization disturbance by a pure rotational process. In the described uniaxial anisotropic element it has been found that by concurrently applying magnetic fields along both the easy and hard axes the remanence can be reversed by pure rotation. That is, with no or insubstantial magnetic domain wall motion. The unusual behavior is described by R. M. Sanders and T. D. Rossing in "Reversible Rotation in Magnetic Films" and C. D. Olson and A. V. Pohm in "Flux Reversal in Thin Films of 82% Ni, 18% Fe," respectively on pages 288 and 274, Journal of Applied Physics, vol. 29, No. 3, March 1958.

The second mode of operation lends itself to logical circuits in that an easy axis aligned magnetic field can either reverse or momentarily disturb the element's residual magnetization only if a predetermined transverse or hard axis magnetic field is simultaneously applied to the element. This performs the well known logical AND function. All large circular symbols not having the letter T associated therewith are operated in the rotational mode as is described for the group carry circuits 18.

DETAILED DESCRIPTION

(1) *Group Add Circuits 14*

Referring now to the FIGURE 5A the group 0 add circuit 14 is shown in detailed schematic form. The other group add circuits are identical as will become apparent. The group 0 portion of the B-register 10 consists of the $B_0$ and $B_1$ bistable elements 62 each of which provides a predetermined current magnitude through the respective lines 64 to indicate a binary one and a substantially zero current to indicate a binary zero. The A-register 12 group 0 portion likewise has two bistable elements 62 with the output lines 65 corresponding to the FIGURE 1 line 20. The elements 62 may be transistorized Eccles-Jordon type of flip-flop circuits with toggle input, i.e. a signal input causes the circuit to change conducting states irrespective of its initial conductive state.

As aforestated the group 0 add circuit 14 adds the group 0 portions of the A and B registers leaving the group sum, modulo $2^k$, in the A register and transferring the carry signal to the group 1 carry circuit 18. The controllable current pulse generator 66 is responsive to a predetermined voltage on its terminal 67 to provide a current pulse for magnetically driving the ferromagnetic transformer mode operated elements 68 through 74, through the series connected drive windings 66D, as described for the clock current impulse source 59 of FIGURE 4A. The information windings of the adder consist of the windings 64 respectively from the $B_0$ and $B_1$ bistable circuits and the lines 65 from $A_0$ and $A_1$.

To add two numbers in the illustrated system, the bias M.M.F. generators 55 and 55A shown in FIGURE 4A are assumed to be operating. Number indicating signals are inserted into the A and B registers in any usual manner. The current magnitudes provided on the lines 64 and 65 may move the magnetization of all ferromagnetic elements within the group along the FIGURE 4 illustrated hysteresis loop 44 in the low permeability region, i.e. between points 50 and 52. Note that there is insubstantial flux change to provide "sneak" or false signals to switch the A-register flip-flop conductive states in the later described sensing windings 78, 82, 84 and 86.

The lines, such as the lines 64, in intersecting the circles 68 through 77 are intended to indicate a printed circuit winding in magnetic association with the indicated magnetic elements. Such windings may be laminated as is well known by the printed circuit fabricators, and preferably have a width equal to the diameter of the ferromagnetic disc.

In step 1, as performed when the source 66 provides a clock current pulse on line 66D, the group sum without inter-group carry is formed in the stages $A_0$ and $A_1$ of the A register. The least significant digit position or stage is toggled whenever the corresponding B-register digit position contains a binary one. The transformer element 68 transfers the clock signal to the output sensing winding 78 which transfers it over the line 80 to toggle the $A_0$ circuit 62.

The higher order digit positions of each respective A-register group are toggled according to the sum of the like significant digits and the carries from the less significant digits. In the illustrated embodiment of two digits per group the $A_1$ circuit 62 is toggled only if $B_1=1$ and if either $A_0$ or $B_0$ equals zero or if $B_1=0$ and both $A_0$ and $B_0$ equal one. These three possibilities of toggling A1 are detected respectively by the sense windings 82, 84 and 86, which are series connected to perform a logical OR function.

If $B_1=1$, $A_0=1$ and $B_0=1$, it is readily apparent that $A_1$ should be toggled twice. In toggling a bistable circuit twice it is returned to its initial conduction state. Accordingly the $A_1$ digit position is not toggled under the above described set of numeric conditions.

The adder output windings 82 and 84 respectively transfer the source 66 pulse to the $A_1$ digit position when $B_1=1$ and the respective $A_0$ and $B_0$ digits are zero. Either one of these digit positions containing a binary zero causes a no-carry condition to A1. The adder input winding 88 transfers the A0 binary one signal to the ferromagnetic element 90 such as to aid the magnetic bias as described with respect to FIGURE 4A. Absence of the one signal, i.e. $A_0=0$, permits the element 90 to transfer the source 66 pulse as provided by the loop winding 92 connected to the element 73. The two elements 73 and 90 must both pass the source 66 pulse in order to toggle the A1 digit position, i.e. a logical AND circuit. Similarly the elements 69 and 75 transfer the source 66 pulse through the loop winding 94 to the output winding 84. The windings 82–84 series connection forms a logical OR circuit.

The winding 86 is series connected with the windings 82 and 84 to complete the adder output circuit to position A1. The source 66 pulse is transferred through the element 70 over the loop winding 98, thence through element 76 over a second loop winding 98A through the element 96 to winding 86 only when $B0=1$ AND $B1=0$ AND $A0=1$.

The group carry is provided through the three windings 100, 102 and 104 over the line 16 to the group 1 carry circuit 18. From inspecting the transformers in each row associated with each of the carry windings, it is seen that a carry signal is provided through the winding 100 if $A_1$ AND $B_1=1$; the winding 102 if $A_1=1$, $A_0=1$ AND $B_0=1$; and the winding 104 if $B_1=1$, $A_0=1$ AND $B_0=1$.

Each of the group add circuits is identical to the just described circuit. It is understood that the terminal 67 is connected to a current pulse source 66 in each group add circuit.

(2) *The Group Carry Circuits 18*

Referring now to FIGURES 5A and 5B, the two arrowhead pairs 106 are to be aligned to show the interrelationships of the two figures. In the FIGURE 5B only the group 0 carry circuit 18 is shown in a detailed schematic diagram.

The carry circuit is essentially a rectangular array of the ferromagnetic elements 34 of M rows and $M^1$ group columns of K-element width ($K=2$). Each column is indicated by the digit group designation as a group carry circuit 18. The A-register "one" output lines 65 extend through the adder 14 and the respective carry circuits 18; the lines corresponding to the lines 22 of FIGURE 1 in which the partial group sum signals are transferred to the carry circuits. Each line 65 is magnetically associated with the hard magnetization axis of every ferromagnetic element in a one element wide M element long column 108.

All of the carry circuits 18 elements 34 are provided with a magntic bias along their respective hard axes by the bias source 55B current in the bias windings 54B. The effect is to rotate the respective elements easy axis 36 residual magnetization, as the vector 36A of FIGURE 4 is rotated, away from the axis 36. The "one" signals in the lines 65 provide an M.M.F. opposing the bias M.M.F. to rotate the magnetization back toward the easy axis. Care must be taken to insure that the bias M.M.F. rotates the magnetizations in the same relative direction to later described sense windings so that in-phase voltages are induced therein.

The respective carry signals are used to provide M.M.F.'s along the easy axes, as later described, to momentarily rotate but not reverse the elements' magnetizations which are partially rotated. It has been found that to rotate magnetizations of elements having uniaxial anisotropy, a reduced magnetic field strength is required to further rotate a partially rotated magnetization than when it is aligned with the easy axis. Accordingly a one signal on a line 65 results in no voltage in a hard axis linked sense winding while a zero signal results in a detectable voltage therein. No induced voltage in the respective carry group windings is a so-called propagated carry signal and is indicative of a group enable in all groups it bypasses.

Each group adder 14 carry signal is temporarily stored in one of the monostable multivibrators 110 which serve to delay the carry transfer. The transfer of carry signals to the respective carry circuits is simultaneously performed by the signal on the terminal 67 as delayed through the time delay element 112 (FIGURE 1) and applied to the AND circuit 114 over the line 116. The resultant delayed carry signals are transferred over the line 16 to the controllable current impulse sources 118. Such sources may be constant current type amplifiers for amplifying the carry signal current. Each source 118 respectively drives a carry drive line 120 which magnetically links the easy magnetization axis of every element in the *m*th row where *m* is the number of the group adder providing the carry. That is, the group 0 amplified carry signal flows through the row 0 winding 120 to momentarily rotate the magnetization of all row 0 elements having their respective residual magnetizations rotated by the respective bias sources 55B. A one signal of course inhibits the momentary partial rotation or disturbance.

The resultant element flux changes are detected in later described sensing windings to be recombined in the group sum circuits 28 to form the intrinsic carries, a voltage in any sense line indicating the presence of a zero in at least one of the A-register digit positions respectively associated with group columns 18.

The sense windings in each group column 18 are series connected with other sense windings to provide an electrical indication of combined group enables for effectively propagating carries. The dashed boxes 122 represent the array *m'*th column intersection with the *m*th row; as in group 0 the box 122 is in row 0, etc. Each row of elements 34 in the array corresponds to a carry signal from a like numbered group, as row 0 is associated with the group 0 carry signal, etc.

In the group 0 circuit 18 row 1 portion a single sense winding 128 is magnetically associated with the elements 34 therein. The winding 128 is magnetically linked to all row 1 elements as indicated by the later described composite lines 129 and 138. For simplicity the winding 128 is broken at the left and right hand sides of the figures, it being understood the winding is physically joined. The winding 128 is connected to the group 1 carry sum circuit 28 as indicated by one of the terminals 140. The effect of this winding, as will become apparent, is to indicate to the group 2 circuit 28 whether or not the group 1 carry was satisfied by one of the other group sums. If not, the group 1 intrinsic carry is made equal to a one.

The group 0 row 2 portion has the two sense windings 130 and 132. The winding 130 may be compared with the winding 128 in that it is linked to all the elements in row 2 to tranfer the group 2 originated carry signal into the group 2 carry sum circuit 28 when all other group sums contain all ones. The winding 132 is linked to all row 2 elements excepting the group 1 elements and accordingly is effective to propagate the group 2 carry signal to the group 1 carry sum circuit 28 when all groups 3 through $M^1-1$ and group 0 are all one's. Two of the rectangular symbols 140 collectively indicate the connection to the group 1 circuit 28.

Each succeeding group 0 row portion has one more winding which is magnetically associated with one less group column in the respective rows to effectively propagate a higher order carry signal to the group 1 circuit 28. Such portions are indicated by the ellipsis 134. In the row M−1 there are $M-2$ sense windings each linking a different number of columnar elements to transfer the $M-1$ carry signal from a driver 118 to one or more of the group sum circuits 28. The winding 136 links only the group 0 row $M-1$ portion to transfer the $M-1$ carry signal to the group 1 sum circuit 28 only when both $A_0$ and $A_1$ circuits 62 contain a binary one signal. The row $M-1$ drive line 120 carries the electrical signal indicative of an end around carry. This latter carry is directed to the group 0 circuit 28 over the line 120A.

Accordingly in the group 0 carry circuit column 18 there are terminated into the rectangular symbol indicated terminals 140 one series connected sense circuit for each inter-group carry signal on the lines 16. Each sum series circuit is magnetically linked to elements 34 in all the respective row column portions effectively interposed between the respective carry originating groups (dashed boxes 122) and the group 0 column in the direction of carry propagation. That is, from right to left circularly as viewed in FIGURE 5B.

In each series circuit the respective propagated carries (voltage nulls) from the group sum signals are combined in a logical AND manner whereupon the combined signals are coincidence compared with the respective carry signals as will be later described. These combined signals are indicative of the intrinsic carries as indicated in FIGURE 1 by the line 26. In this respect the terminals 140 in the respective columns 18 collectively correspond to the FIGURE 1, line 26 while the interconnections of the various circuits 18 sense windings correspond to the FIGURE 1, line 24 for transferring the enables to all the carry circuit portions. Such is indicated in FIGURE 5B by the numeral 24 head lines encircling the sense lines interconnections.

For simplicity the large number of sense lines are indicated by the single lines 129 and 138 terminating in the rectangular symbol terminals 140, each line 138 representing up to $M-2$ physical lines as will be fully described.

The group 1 carry circuit 18 has its dashed box 122 in the oneth row and column. Accordingly the group 1 sense windings, collectively in each row indicated by the line 138, passing therethrough one arranged as for the group 0 circuit 18 but displaced to an array row having a one higher number and with the $M-2$ windings appearing in the row 0 portion. The other group carry circuits have like arranged windings all series connected to form $M-2$ winding circuits in each row. The following table illustrates the number of windings in each row and columnar portion.

TABLE I

[Number of sense windings]

| Row Number | Group Column Number | | | | |
|---|---|---|---|---|---|
| | $M^1-1$ | .... | 2 | 1 | 0 |
| 0 | 1 | ... | M−2 | M−1 | 0 |
| 1 | 2 | ... | M−1 | 0 | 1 |
| 2 | 3 | ... | 0 | 1 | 2 |
| • | • | | • | • | • |
| • | • | | • | • | • |
| • | • | | • | • | • |
| M−1 | 0 | ... | M−3 | M−2 | M−1 |

The series connections between the sensing windings or lines in any array row M will now be described. In the following table of output connections the small letter "*x*" designates that a winding is magnetically associated with the magnetic elements in the enumerated column 18 while the single letter "c" designates the carry signal originating group or column 18. The table includes the specific connections for the row zero to more clearly show how the table is to be used in constructing a carry array in a one's complement additive arithmetic system. The table rows of x's represent the series connected array row windings with left marginal numbers indicating the column in which the respective series windings are terminated into a terminal 140.

TABLE II

[Series Connected Windings in any Row *M* (Series Connected Windings in the Row 0) All numbers are modulo $M^1-1$]

| Terminating Column No. | Column number portions in Row M (0) | | | | | | |
|---|---|---|---|---|---|---|---|
| | M+R−1 ($M^1$−1) | M+R−2 ($M^1$−2) | . . . | M+3 (3) | M+2 (2) | M+1 (1) | M (0) |
| M (0) | — | — | . . . | — | — | x | C |
| M+1 (1) | — | — | . . . | — | — | — | — |
| M+2 (2) | — | — | . . . | — | x | x | — |
| M+3 (3) | — | — | . . . | x | x | x | — |
| . . | . | . | | . | . | . | |
| . . | . | . | | . | . | . | |
| . . | . | . | | . | . | . | |
| $M^1$+M−2 (M−1) | — | x | . . . | x | x | x | — |
| $M^1$+M−1 ($M^1$−1) | x | x | . . . | x | x | x | — |

In the above table a dash (—) indicates no sense line connection to the respective columnar row portions. Note that the directions of numeric carry propagation between the numeric groups is from right to left as viewed in the table and in the FIGURE 5B schematic diagram.

In the row 0 series winding arrangement the group 0 adder 14 carry line 16, indicated by "c" in the table above, is connected to the next more significant group sum circuit 28 (Group 1). In a like manner each of the table indicated windings are connected to the other respective sum circuits 28. In the FIGURE 5B the sense lines are indicated collectively by the composite lines 138 and other aforedescribed sense lines.

From the above tables, it is apparent that the number of windings in any columnar-row portion is expressed as:

$$M+R-C, \text{ Modulo M} \qquad (1)$$

in which R is the row number, C is the group column number and M is the number of groups.

There are $M-1$ sense lines terminated into the terminals 140 in each group column 18 and connected to the carry sum circuit 28 of next greater numeric significance. The most significant group $M-1$ has its terminated windings connected to the group 0 circuit 28 to effectuate the end-around carry function. In this respect the zero group may be considered for purposes of carry determination to be of one greater ordinal value than the $M^1-1$ group. Note the group carry lines 16 are connected to the circuit 28 of groups of next greater numeric significance.

(3) *Group Sum Circuits 28*

As do the adder circuits 14, the circuits 28 perform intra-group addition with intra-group carries. Therefore, the logical structures of these circuits are dependent on the number of bits in the group. In the illustrated two bit groups each of the sum circuits have one carry adding logical element 142 together with the intrinsic carry forming portion 144.

It is remembered that if a propagated carry has *not* been satisfied by lower order groups, modulo $M^1-1$, the intrinsic carry is a binary one signal. This is indicated in the respective sense lines or windings by the voltage nulls. The sense lines are respectively connected to the signal inverters 146 which may be binary voltage amplifiers. For each sense line having a voltage null the respective inverters provide a predetermined voltage to the respective pulse coincidence or logical AND circuits 148. With a voltage on any one sense line the respective inverters 146 provide an insubstantial voltage magnitude, i.e. a binary zero signal, which closes the respective AND circuits.

The AND circuits 148 are probed by the respective row carry pulses on one of the lines 120A. The respective electrical connections from the lines 120A to AND circuits 148 are indicated by the terminals 120B, as seen in the group 0 circuit portion 144; the row indicated by each of the row numbers adjacent the respective circuits 148. In this manner each carry pulse or the respective lines 120A is used to sample the intrinsic carry portion arising from said carry in every sum circuit 28. Thus the line 120A of each group is connected to one AND circuit in every circuit 28 excepting the circuit associated with the digital group of next higher numeric significance than the carry originating group; the purpose of the connection being to sample the voltage on the series connected sense line circuit to determine the binary value of the respective intrinsic carry portions. The junction 126 serves to combine all intrinsic carry portions into one signal; the effect is to add all portions together. Note the carry signal originating in the next lower signal group is combined therewith to form a resultant single signal for each of the respective group sums. The FIGURE 1 line 26 is the combination of the FIGURE 5B sense windings with the lines 120A as joined at junction 126 in the respective Group Sum Circuits 28.

The output of all the AND circuits 148 in each group are joined together and connected to the junction 126 in a logical OR relation. Any binary one intrinsic carry signal or the carry signal through the delay line 124 is transferred through the element 142 when the $A_0$ partial sum equals one as indicated on the winding 150 forming the terminus of the $A_0$ line 65. The intrinsic carry pulse is also transferred over the line 152 through a suitable delay 154 and line 156 to the respective lower order group digit position in the respective A-register groups, such as the group 0 intrinsic carry is transferred to the $A_0$ digit position for toggling same.

The A-register group higher order digit positions are toggled by the respective signals from the elements 142 as transferred over the respective lines 158. A pulse amplifier driver 160 may be provided to increase the one signal amplitude for driving the element 142.

The interconnections from the $M^1-1$ group circuits between the FIGURES 5A and 5B are indicated respectively by the triangular symbols 161. The group 2 lines 156 and 158 are broken, it being understood such lines are physically joined to complete a circuit.

Referring now to FIGURE 6 there is shown a partial group sum circuit 28A for a three bit group. For purposes of illustration, it is assumed these bits are the lowest order, i.e. A0, A1, A2, B0, B1 and B2. The intrinsic carry detection portion 144 is connected to the amplifier 160A as for the FIGURE 5B amplifier 160. Similarly a delay element 124A delays the carry signal and transfers same to toggle the A0 digit position.

The element 162 is an AND circuit comparing the carry pulse with the $A0=1$ signal for inducing a voltage in each of the two sense windings 164 and 166. The winding 164 is connected to the $A_1$ digit position toggle input. The winding 166 is magnetically connected to the element 163 wherein the $A1=1$ signal is ANDed with the element 162 transferred carry signal for providing the A2 digit position toggle signal on the winding 170. In the above described manner yet more digits may be added to each group by effectively providing the described binary counter or add one circuit.

It is understood that each of the various group circuits are like constructed with the interconnections being as schematically illustrated and fully described.

(4) *AND Circuit 30*

Referring to FIGURE 7, the preferred embodiment of the FIGURE 1 circuit 30 for setting the sum of all zeros comprises adding one more row of cores to the carry circuits 18 formed matrix or array, as between the row $M-1$ and the circuits 28. Accordingly the A-register lines 22 are all connected respectively to cores 172 easy magnetization axes. The cores 172 are biased and operate in the same manner as the carry circuits 18 cores. The carry initiate pulse on the line 116 is provided to the windings 174 which are respectively linked to the cores 172 hard axis of magnetization. The series connected sense winding 176 are connected to the binary signal inverter 178 for providing a "set the A-register to zero" signal wherever a voltage null occurs in winding 176, i.e. the A-register contains all ones. A null in each of the windings 176 is a portion of an intrinsic carry. The AND circuit 180 is provided to time the detection by comparing the line 116 pulse with the winding 176 inverted binary voltage. The resultant and delayed output digital signal is provided over the line 32 to all A-register 12 positions to set same to the binary zero state.

(5) *Modified System*

In a modification of the present invention there is included a "set-clear" accumulator, i.e., the group sums from the respective group adders 14' (FIGURES 8 and 9) are entered into the accumulator 12' digit positions by unconditionally setting or clearing the respective bistable circuits to the desired indications as will become apparent. The accumulator stages 182 may have toggling properties, i.e., each stage constitutes a mod 2 counter. The intrinsic carries formed by the carry arrays 18' in cooperation with the group sum circuits 28' may be inserted into the stages 182 as toggle inputs, i.e., will change the state of the respective stages irrespective of its previous state.

The operation of the modification of this invention is broadly the same as that of the preferred embodiment. The group sums are first formed by the group adders 14' and inserted into the A register 12' as will be described. The group carries are then transferred over the respective lines 16' into the carry array 18'. In a similar manner the group enable signals are respectively transferred over the lines 24' into the array 18'. The array 18' is constructed such that the group carries and enables are compared to provide propagated carries over the lines 26' to the respective group sums circuits 28'. The sum circuits 28' thence receive the carries in a form termed the "intrinsic" carry which is added to the appropriate digit group of the A register 12' forming the arithmetic sum therein.

Referring now to FIGURE 8, there is shown in detail a circuit included in each of the blocks 184 of FIGURE 9. Each of the blocks 184 includes the two bit groups from each of the A and B registers together with the associated group adder and the group sum circuit. For simplicity, the illustrated A and B registers have been limited to six bits which are arbitrarily divided into three groups of two bits each.

The formation of the group sum will be first described It is understood that the FIGURE 8 illustrated circuit forms the group sum of two bits from each of the A and B registers. Firstly the augend and addend signals are inserted respectively into the A and B registers in the usual manner. The signal outputs from both the A and B registers are provided over the lines 185 to the add array 14'.

The dots 190 indicate that the respective lines 185 are not magnetically coupled to the respective thin film elements 186. The windings which are coupled carry currents from the A and B register stages for forcing the magnetization of the elements 186 to point 52 of the FIGURE 4 hysteresis characteristic. That is, a current through any one of the windings 185 is sufficient to force the magnetization to the point 52. This in effect places the respective core elements in the saturation magnetization region such that the drive current provided over the line 188 by the driver 192 only moves the magnetization from point 52 to point 50 on the FIGURE 4 hysteresis characteristic to transfer no energy from the drive line 188 to the output lines 16', 24', 194, 196, 198, and 200. Because of this arrangement and as will be explained the complement of the term in each equation drives the array.

The logic of the array will now be described. Each of the core elements 186 in combination with the aforedescribed windings forms a logical AND circuit while the respective output lines being coupled to a plurality of the cores forms a logical OR circuit. For example the elements 186 which are used to form the group carry signal in the lines 16' satisfy the following equations:

Element 202 forms the term $A_{J+1}A_JB_J$
Element 204 forms the term $B_{J+1}A_JB_J$
Element 206 forms the term $A_{J+1}B_{J+1}$ In the above terms the multiplication function indicates a logical AND which is performed through the respective elements while the winding 16' being coupled to the elements 202, 204, and 206 forms a logical OR circuit. A signal in the winding 16' is indicative of a group carry while the absence of a signal is indicative of no group carry, i.e., the group carry equals zero.

Note that the complement of such portion of the above terms provides the signal to the coupled windings. For example, the line 208 couples the signal $B_{J+}0$ to the element 202. Accordingly if $B_J=0$, the element 202 is forced into the saturation magnetization region such that the drive current on line 188 will not be transferred through the core or element to the winding 16'. The AND function results when all of the coupled windings 185 to the respective elements have no currents carried therein.

The other signals are produced in the ADD array in a similar manner and form the following listed equations with the uppermost core element 210 forming the leftmost term of the respective equations and with the succeeding terms in order of the descending elements as shown in FIGURE 8. The dashes above the respective term portions indicate the binary state is "zero."

Group Enable$=\overline{B}_J\overline{B}_{J+1}A_JA_{J+1}+\overline{B}_JB_{J+1}A_J\overline{A}_{J+1}$
$+B_J\overline{B}_{J+1}\overline{A}_JA_{J+1}+B_JB_{J+1}\overline{A}_J\overline{A}_{J+1}$
Clear $A_{J+1}=B_{J+1}\overline{A}_JA_{J+1}+\overline{B}_JB_{J+1}A_{J+1}+B_J\overline{B}_{J+1}A_{J+1}A_J$
Set $A_{J+1}=B_{J+1}\overline{A}_J\overline{A}_{J+1}+\overline{B}_JB_{J+1}\overline{A}_{J+1}+B_J\overline{B}_{J+1}A_J\overline{A}_{J+1}$
Clear $A_J=B_JA_J$
Set $A_J=B_J\overline{A}_J$ The $A_J$ stage of the register 12' is set when a signal is transferred to the output winding 200 and is cleared when a signal is transferred to the output winding 198. In a similar manner the $A_{J+1}$ stage is set to "1" by a signal in the output winding 196 and is cleared to "0" by a signal in the output winding 194. This provides the group sum in the A register 12'.

Referring now to FIGURE 9, it is seen that the lines 16' and 24' respectively correspond to the output windings shown in FIGURE 8 for the group carry and group enable signals. These lines are connected to the current drivers 212 each of which has capacity to temporarily store the output signals, such as by a monostable multivibrator. Further the drivers 212 invert the binary signal, that is, when a current pulse is received, no output current is provided and vice versa. The current drivers 212 are respectively connected to the drive lines 214 for transferring the respective driver output pulses to the carry array 18'. The operating principles of the array 18' are identical to the ADD array 14' and the same nomenclature is used. Remember that the AND function is performed by the complement of the "signal" to be transferred, thus the reason drivers 212 include complementation.

The carry array 18' is divided into three groups of three cores 216. Each group of cores is associated with one of the FIGURE 8 illustrated circuits 184 for providing the propagated carry thereto. Accordingly in expanding the illustrating embodiment there is one group of cores for each of the digit groups in the A and B registers. Further there is one core in each and every one of the groups for each of the circuits 184.

A current pulse driver 218 provides a unidirectional pulse over the line 220 which is selectively transferred to the output windings 222, 224, and 226 depending on the combination of the group carry and enable signals as set forth in the following equations wherein the terms of each equation correspond to the respective elements 216 in descending order.

$$\text{Group 2 carry} = C1 + E1C0 + E1C2E0$$

$$\text{Group 1 carry} = C0 + C2E0 + E2E0C1$$

$$\text{Group 0 carry} = C2 + E2C1 + E2E1C0$$

The transferred pulse on the output windings 222, 224, and 226 are respectively inserted into the noncomplementary current drivers 228 from whence they are transferred to the group sum circuits 28'.

Referring again to FIGURE 8, the group zero carry pulse from the Group 0 driver 228 is received on the line 230 as an intrinsic carry. From line 230 the carry pulse is transferred through the delay element 232 to toggle the $A_J$ bistable circuit 182 to the opposite state. The delay is necessary to permit the "0" signal from the $A_J$ circuit to be applied to the saturable transformer element 234 for determining whether or not the $A_{J+1}$ circuit is to be toggled. If $A_J=0$, the carry pulse should not be transferred to the next higher order digit position. Accordingly the current provided from the $A_J$ circuit 182 saturates the transformer core 234 as aforedescribed for the array core elements and no signal is transferred for toggling the next higher order digit position. However, when $A_J=1$, no current is provided through the winding 236 and any impulse from the line 230 will cause the magnetization of the core 234 to traverse its high permeability region for inducing a voltage in the winding 240 which results in toggling the $A_{J+1}$ digit position.

When more than two bits are provided for each of the digit groups, the counter arrangement is provided for adding the intrinsic carries to the respective groups as in the manner described for the preferred embodiment.

FIGURE 10 illustrates an alternate way of adding the intrinsic carry signal on line 230 to the respective group sums contained in the A register. Two saturable transformer film cores are provided for each digit position in the respective group sum signal groups; one core is for "setting to one" and another core for "clearing to zero" the respective digits. The intrinsic carry signal on line 230 passes through a winding coupled to all the cores 232, 234, 236 and 238 for being selectively gated to the A register digit positions. The film elements are biased in the manner described for the add and carry arrays by the output signals from the corresponding A register digit positions, with the bar over the symbol indicating a line which would carry a current only when the information content in that digit position is zero. The signal complements are used as will become apparent. The logic equations for the illustrated array are as follows:

$$\text{Set } A_J = C\bar{A}_J \text{ (core 236)}$$

$$\text{Clear } A_J = CA_J \text{ (core 238)}$$

$$\text{Set } A_{J+1} = C\bar{A}_{J+1}A_J \text{ (core 232)}$$

$$\text{Clear } A_{J+1} = CA_{J+1}A_J \text{ (core 234)}$$

where C is the intrinsic carry signal equal to "1"

The windings 242, 244, 264, and 248 provide the respective output means for the core array. The windings 242 and 246 are electrically connected to the "set" side of the A register group stages $A_{J+1}$ and $A_J$ respectively. The windings 244 and 248 are respectively connected to the "clear to zero" input of the A register stages $A_{J+1}$ and $A_J$. With these interconnections the A register is not required to have toggling properties in its digit positions to form a true "set-clear" accumulating register. The time delays 250 on windings 246 and 248 and used to ensure that the $A_J$ digit position is not switched before the $A_{J+1}$ digit position completes its switching. It should be apparent to those skilled in the art that premature switching of the lower order digit position could induce an error in the setting or clearing of higher order digit positions.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. An arithmetic system for adding two numbers each of which consists of parallel signal groups each with a plurality of digital signals, a plurality of add means for adding together the respective signal groups to form a like plurality of group carry and sum signals with the sum signals each consisting of a separate signal for each digit position to be added, carry means connected to every add means for substantially, simultaneously and separately comparing every group carry signal with all of the group sum signals excepting the sum signals from the respective carry signal originating group add means and including digital signal means for combining the resultant signals from the separate comparisons, means for forming one intrinsic carry signal for each of the respective group sums, and separate add one means connected to the carry means and the respective add means for adding the intrinsic carry to the respective group sums.

2. An arithmetic system of the parallel group digital signal type having a plurality of signal groups in each of two number indicating sets of digital signals, a plurality of group add means for adding the respective group signals together from both signal sets to form a like plurality of group carry and group sum signals respectively in each means, said sum signals having a separate signal for each digit position to be added, carry means connected to all of the group add means for electrically separately and substantially simultaneously coincidence gating every carry signal with all of the group sum signals excepting the respective sum signals formed by the carry originating add means, sensing means in the carry means for each numeric group and each having a sensing line for sensing the coincidence between each group carry signal and each group sum signals respectively indicative of a group sum digital number capable of terminating a numeric carry, the sensing lines being interposed between the respective carry originating groups and said each numeric group in the direction of carry propagation intrinsic carry forming means for each one of the groups and each being electrically connected to all of the latter interposed sensing lines such that a resultant signal is formed indicative of said carry-sum signal coincidence and connected to the one less numerically significant add means for combining the carry signal therefrom with the resultant signal to complete an intrinsic carry, and add one means interconnecting the intrinsic means and the add means for respectively adding the intrinsic carries to the group sums.

3. An arithmetic system having addend and augend input means, each of the means consisting of a plurality of digital groups with each group having a predetermined number of digital positions, group add means connected to both input means and having group carry output line, carry means respectively connected to the group carry lines which are associated with add means of effectively one less ordinal position and to all augend input means, said carry means having a row of saturable transformers for each said digital group, intrinsic carry sensing means coupled to all the carry means in the respective rows for separately and independently forming a carry result for each of the groups, group carry summing means connected to the intrinsic means and to the augend means respective group lowest order digit positions, and two step electrical timing pulse means connected to the add means for sequentially causing the formation of individual group sums and carries and then forming intrinsic carries and adding same to the group sums via the carry summing means.

4. Apparatus as in the claim 3, further including negative zero detecting means comprising a single row of said saturable cores in the carry means and each core being respectively inductively connected to augend input means digit positions, and timing means inductively connected to the latter cores for momentarily magnetically urging same in a predetermined manner, whereby the single row cores each magnetically traverse only a saturation magnetization portion of their respective hysteresis characteristics for all binary ones in the augend means and means responsive to all the cores in the detecting means traversing only a saturation magnetization portion to set the sum to zero.

5. An arithmetic system having two digital signal input means each of which consists of parallel signal groups of a plurality of binary signals and arithmetic sum digital signal means, magnetic core adding means connected to the two input means for forming group sum, group enable and group carry signals from the respective signal groups, and connected to the sum means for inserting said sums therein, carry means connected to the sum means and to the adding means for forming an intrinsic carry signal, the carry means including an array of groups of saturable magnetic cores, the adding means connection to the carry means comprising separate windings having respective magnetic couplings with selected cores in the respective groups of the array and the number of such groups being the number of group carry signals, the sum means connection to the carry means comprising separate windings having magnetic couplings with every core in a respective group of the array such that each sum means is associated with one group of cores, magnetic bias means magnetically associated with every group in the array such as to oppose the magnetic influence of the said add means magnetically coupled to the respective core groups, said sum means coupling each core group to the respective group sum means for receiving said intrinsic carry signal for each group and adding the intrinsic carry to each of the digital signal groups in the sum means.

6. An arithmetic system of the digital signal parallel group type having a plurality of ferromagnetic elements with cores exhibiting uniaxial anisotropy, comprising M groups of addend and augend digital signal input means, each group with K digital signal positions respectively indicative of numeric values, M group add means respectively connected to both input means in the respective groups, each add means including a plurality of the said elements and bias means for magnetically biasing the add elements to one of two magnetic saturation states along their respective hard axes, separate winding means for coupling both input means respective digit positions to predetermined ones of the add elements along their hard axes for changing the magnetic saturation states for one input indicated binary value from the one to the other state, current impulse means having winding means magnetically associated with selected one add elements for magnetically urging same into a high permeability portion of their respective hysteresis characteristics when they are in a predetermined one of the two saturation states, a plurality of sensing winding means associated with predetermined elements of the add means to transfer a group carry signal and group sum signals within a modulus of K digits, magnetic element array carry means having M rows and M groups of K columns of the elements with no elements at the intersection of the $m$th row and the $m$th group of columns, $M-1$ carry sensing windings in each array row with the different windings in each row beginning at the $m$th—$m$th row-column intersection winding and coupling the hard magnetization axes of cores in different columns and extending in the direction of carry propagation, each array element in the respective array rows having residual magnetization in the same relative directions along their respective easy magnetization axes, magnetic bias means in the carry means for rotating the residual magnetizations away from the easy axes in like relative directions, sum means connected to the add means for receiving the group sums and having separate winding means associated with every element in the array columns corresponding to the group sum digit positions for opposing the bias to rotate the magnetizations back to the respective easy axes for a predetermined binary value in the sum digit positions, the add means respective group carry sensing windings having amplifying means with separate winding means respectively magnetically linked to the easy axis of every element in the respective array rows of said magnetic element array carry means for momentarily partially rotating the rotated magnetizations, M intrinsic carry forming means each connected to a sensing winding in every row of the array carry means except the row receiving its carry signal from the $M-1$ group add means, the add means carry signal and the signals from the array sensing winding combining to form the respective group intrinsic carries, and carry adding means connected to the sum means and the intrinsic carry means for forming the total sum of the augend addend in the sum means.

7. For an arithmetic system used to process digital signals indicative of numeric values and arranged in M groups of K signals, an intergroup carry transfer circuit comprising an array of electrical signal coincidence gating means arranged in M columns of K means width and M rows, with no gating means at the junction of like numbered columns and rows, a group signal input means associated with each column and connected to each gating means in the column for transferring digital signals thereto indicative of the respective group sums, carry means in each row connected to every gating means in that row for applying a digital signal thereto indicative of a group carry numerical value and in coincidence with the sum signals whereby the gating means respectively transfer a resultant signal upon coincidence of two predetermined sum and carry signals, output means comprising electrical lines formed to M groups of lines each having one line in each row and all lines in each group terminating in one column, the lines being connected to the gating means in each respective row which are interposed between the terminating column and said respective associated columns in a direction from which a carry signal is to be propagated, and sensing means connected to all lines in each group for receiving the gating means transferred digital signals to combine same together to form an intrinsic carry for each of the M groups.

8. For an arithmetic system used to process numbers having M groups of K digits, an intergroup carry transfer circuit comprising an M row array of ferromagnetic elements each having uniaxial anisotropy with M columns of K-element groups with a K-element group at the juncture of each row and column except the $m$th row and the $m$th column, M carry signal lines respectively inductively connected to every element in the M rows, a group sum input means inductively associated with each element respectively in a column for magnetically biasing same to partially rotate the elements' respective magnetizations away from their easy axes whenever a one binary signal is provided to said respective columns in each of the M groups, all elements respectively in the M rows within that group having the $M-1$ sensing winding means linked to the elements' respective hard magnetization axes, each of the sensing winding means in each row coupling said elements in series to form $M-1$ parallel sensing circuits, momentary magnetization reversing means independently magnetically associated with every element in the respective M rows and connected respectively to the Mth carry signal line for momentarily reversing the elements' magnetization only when a carry signal equals one and the group sum digit bias equals zero, and separate utilization means selectively connected to said $M-1$ sense lines in each row for providing an intrinsic carry signal associated with each group in response to no magnetization momentary changes.

9. Apparatus as in claim 8 wherein each utilization means comprises a magnetic saturable transformer unity adder for adding the intrinsic carry to a number indicating group of digital signals and the transformer having a core with uniaxial anisotropy with all windings thereon linked to its hard magnetization axis.

10. Carry means for an arithmetic system used to add M groups each of K digital number indicating signals in parallel fashion comprising M rows and K-element wide columns of coincidence pulse gating electrical elements with no element at the intersection of the $m$th row with the $m$th K-element column, separate partial sum digital signal carrying input lines being input coupled to each of the elements in each K-element column, separate group carry signal lines being input connected to every element in the respective rows, a plurality of sense lines in each row respectively having their origins in one of said columns, each of the said sense lines terminating in any one of the columns except the one in which said line has its origin, each of the sense lines being output connected to every element in said each row that is interposed between the terminating column and the column without such elements in a direction of arithmetic carry propagation as taken from the latter column, and intrinsic carry determination means associated with each column by electrical connection to all terminated sense lines therein and to all of said carry lines.

11. Carry means for an arithmetic system used to process two sets of digital number indicating signals, each set being arranged in groups of such signals and having a different numeric significance, the improvement comprising an array of uniaxial anisotropic planar elements arranged in digit columns and carry rows, each of the elements having easy and hard magnetization axes, group sum input winding means magnetically associated with one of the axes in each element of the respective columns, carry input winding means magnetically associated with the other magnetization axis of each element in the respective rows, a planar element being in each row-column intersection except the ones wherein both the column and the row are associated with winding means from the same signal groups, each element having magnetic remanence along its easy axis, magnetic bias means associated with every element for rotating its remanence away from its easy axis, one of the winding means carrying a momentary current to momentarily partially further rotate the remanence sensing means in the array for detecting the momentary rotations, and intrinsic carry means connected to the sensing means and to the carry input means for combining same into one signal for each respective signal group.

12. An all one's detector comprising a plurality of uniaxially anisotropic saturable magnetic cores each with an easy and a hard magnetization axis, each core having magnetic remanence aligned along its easy axis, magnetic bias means magnetically linked to each hard axis of every core for rotating the remanence away from the easy axis, separate windings magnetically linked to the hard axes of the respective cores each of which is indicative of a binary digit position, the magnetic bias and separate winding linking being mutually opposing in every core, means magnetically associated with the easy axis of every core for momentarily rotating the rotated magnetizations, and sensing winding means for detecting the absence of momentary magnetization rotation in every one of said cores.

13. An arithmetic system for adding two binary numbers each of which consists of parallel signal groups of a plurality of binary signals, a plurality of thin ferromagnetic film saturable transformer add array means for forming group sum, group enable and group carry signals of the respective signal groups, saturable transformer carry array means connected to the add array means for receiving said group enable and group carry signals and forming intrinsic carries, said carry array means having a group of cores for each signal group with each core group having a number of cores equal to the number of signals in all the parallel signal groups combined, the enable signals and the carry signals being coupled to predetermined transformers in the respective carry groups, pulse driver means connected to the add array and carry array means for successively providing current impulses thereto whereby the add array and then the carry array are energized, a plurality of sensing windings in the carry array for providing intrinsic carries and each serially connected to all of the said transformers in one of said carry groups and M intrinsic carry add means each connected to a sense line of the carry array to receive the intrinsic carry signal and to the group sum signals for adding the intrinsic carry signal to the respective group sums.

14. Apparatus as in claim 13 wherein the signal group and group sum have complement signals which are provided to the arrays for saturating the transformers for blocking the current impulse whereby the impulse is inductively coupled through the transformers in the array which are indicative of an arithmetic term resulting from a combination of the signal groups.

15. Apparatus as in claim 13 wherein each carry add means comprises a saturable transformer array selectively biased by the group sum signals and having two thin film transformer means for each binary digit in the group sum for selectively and unconditionally altering the group sum digits, and the respective intrinsic carry being coupled to each transformer in the last mentioned array whereby the intrinsic carry signal indicated binary value is effectively added to the respective group sums and wherein the group sum signals include binary complement signals and these latter signals are provided to the last mentioned array for selectively blocking the group carry signal.

16. An arithmetic system of the parallel digital signal group type having addend and augend digital signal input means, each of the input means consisting of a plurality of digital signal groups each having a plurality of digital signals, digital signal sum means, a plurality of magnetic core transformer digital adding means connected to both input means and the sum means for forming the digital group partial sum and carry signals and inserting the partial sum signals into the sum means, magnetic core carry means in an array of core rows and columns connected to the sum means and to the adding means for receiving group carry signals and having carry propagating winding means aligned with the array rows, the partial sum signals biasing every core in respective columns of the carry array for simultaneously comparing every partial sum signal with every carry signal in the respective columns and rows for inducing signals in the said propagating winding means indicative of a propagated or a fast carry, intrinsic carry adding means connected to said propagating winding means for determining the intrinsic carry for each of the sum groups, said intrinsic carry adding means being connected to each of the digital adding means for receiving the respective carry signals to gate signals from said propagating winding means which were generated from the comparison of the respective carries and group partial sums, and the sum means being coupled to the intrinsic carry means for receiving such carries for forming the total sums from the group partial sums with the respective intrinsic carries.

References Cited by the Examiner

UNITED STATES PATENTS

| | | | |
|---|---|---|---|
| 2,819,018 | 1/58 | Yetter | 235—176 |
| 2,954,168 | 9/60 | Maddox | 235—175 |
| 3,070,783 | 12/62 | Pohm | 340—174 |
| 3,100,836 | 8/63 | Paul et al. | 235—175 |

OTHER REFERENCES

Kilburn et al.: Parallel Addition in Digital Computers: A New Fast "Carry" Circuit, Proceedings of the Institute of Electrical Engineers, vol. 106, No. 29, Part B (September 1959) (p. 467, FIG. 2 relied on).

MALCOLM A. MORRISON, *Primary Examiner.*

CORNELIUS D. ANGEL, *Examiner.*